United States Patent [19]

Boissy et al.

[11] Patent Number: 6,029,095

[45] Date of Patent: Feb. 22, 2000

[54] METHOD AND DEVICE FOR DYNAMIC SYSTEM CONTROL

[75] Inventors: Jean-Christophe Boissy, Saint Maurice; Olivier Rech, Caen, both of France

[73] Assignee: U.S. Philips Corporation, New York, N.Y.

[21] Appl. No.: 08/947,047

[22] Filed: Oct. 8, 1997

[30] Foreign Application Priority Data

Oct. 10, 1996 [FR] France .................................. 96 12378

[51] Int. Cl.⁷ .................................................. G05B 13/02
[52] U.S. Cl. .............................. 700/50; 700/28; 700/47; 700/54; 700/58; 360/78.09; 360/78.02; 360/69; 360/71
[58] Field of Search ..................... 364/148.01, 148.02, 364/148.05, 148.09, 167.02, 164, 165; 360/78.09, 71, 69, 75, 78.02, 74.1, 73.01

[56] References Cited

U.S. PATENT DOCUMENTS

| | | | |
|---|---|---|---|
| 4,229,618 | 10/1980 | Gamble | 179/1 F |
| 4,641,020 | 2/1987 | Iwai | 250/201 |
| 5,206,566 | 4/1993 | Yoshida et al. | 318/568.22 |
| 5,345,347 | 9/1994 | Hopkins et al. | 360/71 |
| 5,448,203 | 9/1995 | Mauti et al. | 330/149 |
| 5,510,939 | 4/1996 | Lewis | 360/78.09 |
| 5,574,407 | 11/1996 | Sauer et al. | 331/14 |

FOREIGN PATENT DOCUMENTS

0598594A2  5/1994  European Pat. Off. .
2217902A  8/1990  Japan .

OTHER PUBLICATIONS

"Optimisation Toolbox User's Guide" pp. 3–9 to 3–12 Published By "The Mathworks, Inc. Natick Mass".
"Optimization Toolbox User's Guide", pp. 3–8 to 3–10, Produced By "The Math Works, Inc. Natick Mass".
"Optimization Toolbox User's Guide", pp. 9–99 to 9–101, Produced By "The Mathworks, Inc. Natick Mass".

*Primary Examiner*—William Grant
*Assistant Examiner*—Ramesh Patel
*Attorney, Agent, or Firm*—Edward W. Goodman

[57] ABSTRACT

A method of controlling automatic state returns relates to a dynamic system coupled to an automatic control operating in a discrete negative feedback mode. The method includes a phase for defining a controller, and a phase for operating the system. The defining phase is realized in an open-loop learning phase which includes a step of reading states in which a system may be situated, and a step of generating commands for returning the system to an ideal state. When the commands generating step takes place, the method supplies, for each state, a sequence of discrete commands which are determined by imposing a constraint intended to reduce the error relative to that state below a predetermined threshold.

20 Claims, 3 Drawing Sheets

METHOD AND DEVICE FOR DYNAMIC SYSTEM CONTROL

BACKGROUND OF THE INVENTION

1. Field of the Invention

The invention relates to a method of controlling automatic state returns for a dynamic system coupled to automatic control means operating in the discrete feedback mode, the method comprising a defining phase for defining the automatic control means and an operation phase for operating the system, the defining phase being an open loop learning phase which comprises a step in which states are read in which the system may be situated, and a step in which commands are generated, these commands being used for correcting errors measured between the states and an ideal state.

The invention likewise relates to an apparatus comprising a control system coupled to automatic control means defined by the method. The invention also relates to a controller defined by the method for realizing the automatic control of such apparatus.

The system may be a hard disk of a computer or, more generally, a system for recording and reproducing data or signals, for example, audio or video signals.

2. Description of the Related Art

European Patent Application EP 0 598 594 describes a controller for a disk drive system. The controller moves a read/write head relative to the tracks of the disc as a function of a predetermined velocity profile. If the desired profile is not adhered to, the controller produces commands for correcting the differences observed. This controller utilizes the fuzzy logic technique for effecting these corrections. These corrections are shown in the form of fuzzy rules which are stored in devices suitably used while the system is being operated. Such a system may adopt various states, one state being defined by a state vector in which various parameters selected according to the type of the system, or according to the control, one wishes to effect. Thus, one may wish to prefer a control of the velocity of the read/write head as in cited document, or carry out a control of the position of the head relative to the tracks of the disc, or any parameter or any other parameter association. In the case of a hard disk, if the read head is not correctly positioned on the track of the disc, either the read/write operation is stopped, or the head is returned to the center of the track. The problem posed then consists of returning the system, situated in a defective state, to an ideal state for which the errors relating to each parameter are zero or at least very small, the errors being measured between the real state of the system and the ideal state.

In a general manner, the control systems may be linear or non-linear. The linear controllers, such as the PID controllers (Proportional Integral/Differential Control), may be ill-adapted to a control of such systems. A PID controller is a linear controller which realizes a linear combination of the terms P, I and D. Such a linear controller provides an approximation which is not always satisfactory and, therefore, leads to errors which may adversely affect the precision of the controller.

Nevertheless, there are approaches utilizing non-linear controllers, but they are generally very hard to use, so that often mediocre automatic control qualities are the result.

SUMMARY OF THE INVENTION

It is an object of the invention to improve the performance of the controllers of the dynamic systems and, particularly, of the non-linear dynamic systems by defining the controllers so that they can be adapted to any sorts of systems whether linear or non-linear.

This object is achieved by providing that for defining the automatic control means during the step in which commands are generated, the method produces, for each state, a sequence of discrete commands which are determined by imposing a constraint intended to reduce the error relating to the state below a predetermined threshold, after a predetermined duration, to bring the system close to the ideal state.

Accordingly, each state of the system is corrected by a sequence of commands to bring the system to the ideal state. These commands are then automatically used during the operation phase of the system. In this manner, a dynamic system can be controlled very precisely, be this system linear or non-linear. More particularly, in the case of a non-linear system, the automatic control errors may be made less than a predetermined limit.

Preferably, these sequences of commands are stored in a storage means, for example, a look-up table, so that, in the operation phase, the automatic control means provides that the sequence of commands is read out which relates to the real state of the system at the instant under consideration.

During the learning phase, the automatic control means is defined so that the system passes from a real, selected state to an ideal state by imposing time constraints on errors noticed in the parameters, these errors designing the difference which appears between the real state of the system and the sought ideal state. In the case of means for automatically controlling a read/write head of a hard disk, these parameters are, for example, the position of the head, the moving velocity of the head, inherent resonance of the system because of its construction. A state vector will then have the form: (position, velocity, resonance 1, resonance 2). Each parameter forming the vector will have limits which have to be taken into account for adhering to the constraints.

Various techniques may be used for computing the commands, for example, the known techniques of optimization under constraint.

These and other aspects of the invention will be apparent from and elucidated with reference to the embodiments described hereinafter.

DESCRIPTION OF THE PREFERRED EMBODIMENTS

According to a preferred application, the invention is described hereafter in the case of the control of a hard disk of a computer system. We are facing only an embodiment of the invention, because the invention may be utilized in other applications, such as the recording and reproduction of audio or video signals or, more generally, in automatic control applications which necessitate an automatic control of linear or non-linear dynamic systems.

Figure 1:
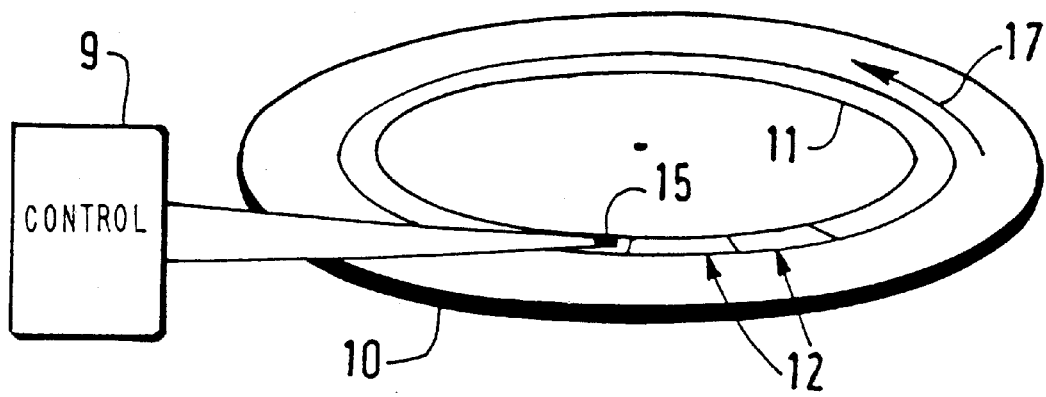
FIG. 1 shows a diagram of a hard disk with a read/write head.

FIG. 1 represents a disc 10 comprising tracks 11 divided into sectors 12 in which data are stored. A read/write head 15 makes it possible to read the stored data from the tracks. The disc is movable and rotates in the direction of the arrow 17. When in operation, the head 15 is to remain correctly positioned relative to the track 11, so that the data is correctly read or written. Automatic control means 9 permits controlling the parameters which characterize the head 15 such that any errors are the smallest possible.

Figure 2:
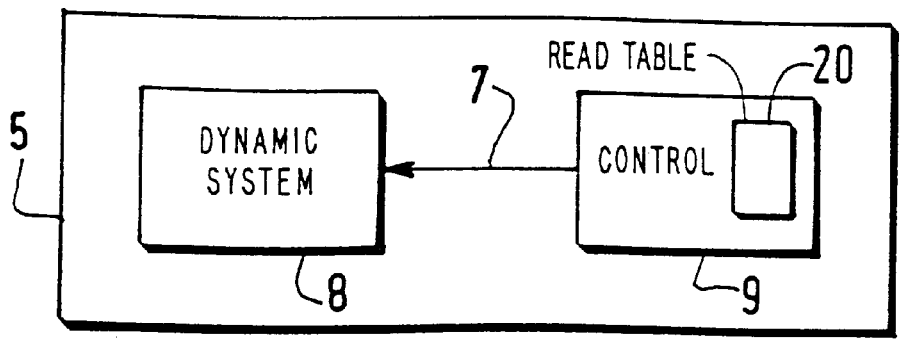
FIG. 2 shows a diagram representing an apparatus formed by a dynamic system coupled to automatic control means.

FIG. 2 diagrammatically shows an apparatus 5 formed by a dynamic system 8 to be controlled (here a disc unit) and the automatic control means 9 which applies commands 7 to the system 8. For setting the automatic control, such a system may be defined in various parameters. By way of example, one may choose to take into account:

the position P of the read head;

the velocity V of the displacement of the read head;

a first resonance R1 of the system which takes into account particularities as regards the structure of the system to be controlled. For example, this is about taking into account the system reaction time to a pulse given to the system; and a second resonance R2 of the system for another type of resonance.

Figure 5:
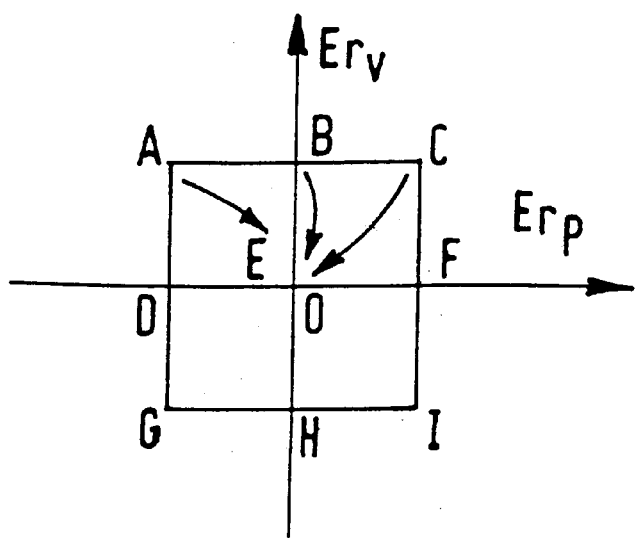
FIG. 5 shows a nine-state embodiment of a system.

These four parameters form a vector (P, V, R1, R2). Each parameter varies in a given interval. For the design of the controller, consider a finite set of vectors representing the space of the states of the system. In this manner, a plurality of vectors is obtained which define various possible states of the system to be controlled. For simplicity, only two parameters may be considered, the position P and the velocity V. Suppose that there are 3 representative values for each of these parameters. Thus 9 state vectors are obtained. The result is a state diagram which has the shape symbolically represented in FIG. 5 for a system having nine states A, B, C, D, E, F, G, H, I. In this diagram, the axes represent an error $Er_P$ in the position of the header, and an error $Er_V$ in the velocity of the head. The learning will consist of reducing the system from any one of the eight states to the ideal state represented here by the state E corresponding to a zero error.

Figure 4:
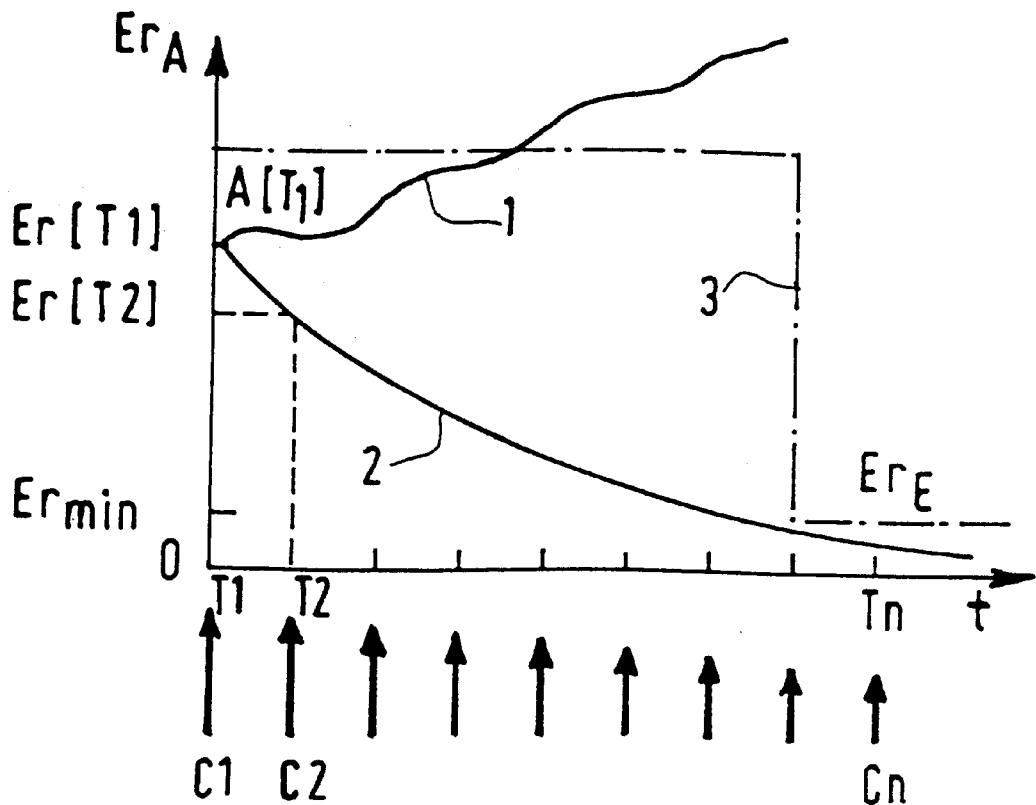
FIG. 4 shows curves which represent the evolution of the system based on a state selected in response to commands generated by automatic control means defined according to the invention.

FIG. 4 represents the variations of an error $Er_A$ during time T for one of the parameters forming the characteristic state vector. For example, a positioning error of the head 15 relative to the center of the track 11 may be concerned. Consider the state A at time $T_1$ for which the error $Er_A$ has a value $Er[T_1]$. If the system were not automatically controlled, it would freely evolve to an erroneous state represented by the irregular curve 1 for which the irregularities represent resonance of the system. According to the invention, the error $Er[T_1]$ is desired to become smaller than a predetermined limit $Er_{min}$ after a certain time period $T_n$, that is to say, $Er[T_n] = Er_E$. Therefore, the method computes a sequence of commands $C_1, C_2, C_3, \ldots, C_n$ which, applied at consecutive instants $T_1, T_2, T_3, \ldots, T_n$, take the system (curve 2) to the ideal state represented in the example by state E. Thus, this is not a single command that causes the system to change from the state with position error to the state without position error, but this is a sequence of commands $C_1, C_2, C_3, \ldots, C_n$. The sequence of commands makes it possible to adhere to the constraint represented by the broken line 3. It is then possible to make finer corrections of the variations of the system and, consequently, be suitable for non-linear dynamic systems.

According to the invention, this sequence of commands is generated during a learning phase on the basis of the states belonging to the system to be controlled. To that end, a constraint 3 is defined which restricts the maximum tolerated error when the error $Er[T_1]$ evolves to the error $Er_{min}$. At the instant $T_1$, the learning phase generates a command $C_1$ which brings the error $Er[T_1]$ to a value $Er[T_2]$, and so on and so forth for the other commands. Thus, for each state, one disposes of a sequence of commands $C_1, C_2, C_3, \ldots, C_n$ which permits of correctly automatically controlling the dynamic system to be controlled. The learning is realized so that, when the system evolves from a given state, while applying the sequence of commands relating to the state, it comes relatively close to the ideal state. In this manner, the first command is sufficient to bring the system to the ideal state. It is thus sufficient to store each first command $C_1$ of each sequence to ensure the control of the system. This avoids forming a basis of large-proportion sequences of commands and avoids having different commands for a same state. Preferably, all of these first commands are stored in a look-up table at the end of the learning phase. Subsequently, during the operation phase of the system, the automatic control means addresses the look-up table for extracting the commands relating to the real state of the system at the instant under consideration.

Figure 6:
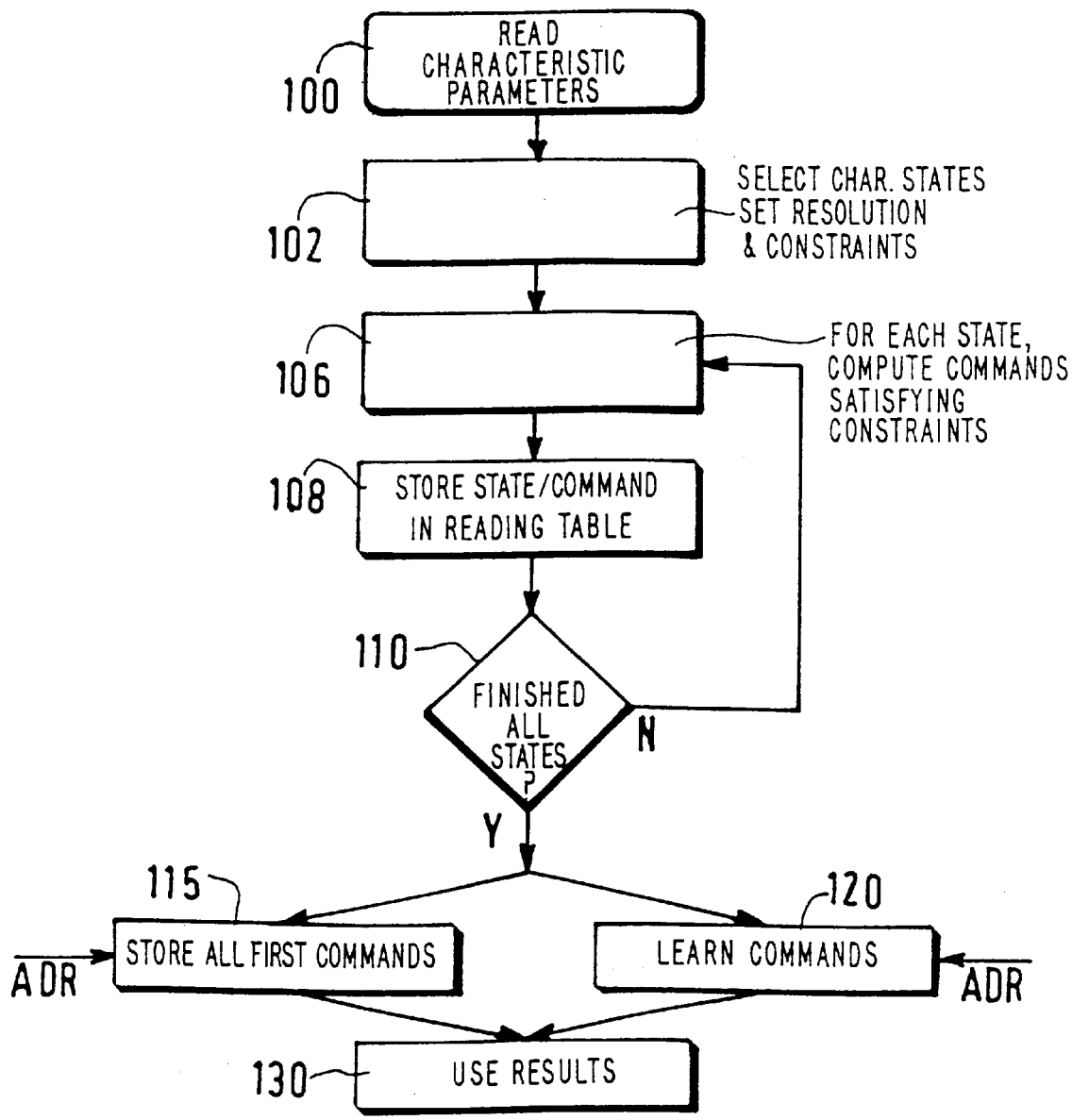
FIG. 6 shows a flowchart showing the various steps of the learning phase according to the invention.

FIG. 6 shows the flowchart of the various learning steps:

step 100—reading the characteristic parameters of the system to be controlled;

step 102—selecting the different characteristic states of the system to be controlled, setting the sought resolution and the constraints imposed on the parameters;

step 106—for each state, computation of the n commands permitting of satisfying the constraints imposed on the parameters;

step 108—storing the state/command pair in a storage means (look-up table);

step 110—when a state has been processed, changing to the next state via a return to state 106 and this until all the states have been tested; and step 115—storing all the first commands in a look-up table for later use.

The various steps which have just been described permit defining the automatic control means.

The processing, which consists of solving the problem of constraints, may be carried out with the aid of a conventional computer applying, for example, the known algorithm "CONSTR" of optimization under constraint of the MAT-LAB software described in the document "Optimisation Toolbox User's Guide" pp. 3-9 to 3-12 published by "The MathWorks, Inc., Natick, Mass.".

All the first commands, determined as has just been described, are stored in a storage means, for example, a look-up table 20 (FIG. 2). When the results are used (step 130), the look-up table is addressed (step 115, address ADR) by the parameters characterizing the state to be processed so as to obtain the first corresponding command which is used for realizing the automatic control.

For using the operation phase, it is possible not to use the look-up table, but rather, substituting the look-up table with a fuzzy logic device or a neural network which produces the sequences of commands. The contents of the look-up table is then learned by the fuzzy logic controller or by the neural network (step 120). Therefore, when the sequences of commands have been determined during the learning phase, the method uses these sequences of commands to provide another type of learning which consists of constructing the fuzzy logic device or the neural network, so that either is capable of generating the sequence of commands based on real states of the system in the operation phase. This provides the advantage of avoiding having to use a look-up table, which could have a considerable size if the number of commands to be stored became large.

Figure 3:
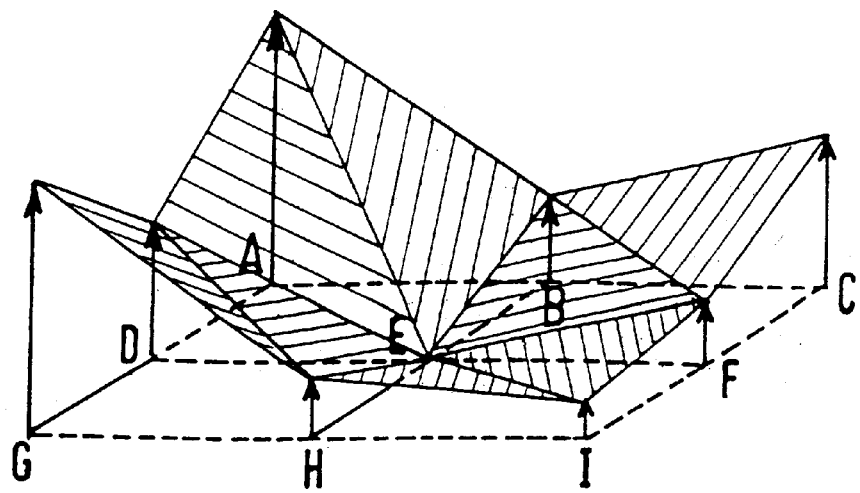
FIG. 3 gives a representation indicating a surface which defines the amplitude of the commands according to the states of the system.

The selected number of states taken into account for making the learning is reduced relative to the number of states which may really be taken by the system. For obtaining a command which can be applied to a real state, it is thus generally necessary to interpolate between the stored commands. When considering the example of FIG. 5, a command is assigned to each selected state of the system this command being represented in the form of the diagram of FIG. 3. The nine states are placed in the same plane, the commands associated to each state being represented perpendicularly in this plane. By connecting, via a straight line, the ends of the command lines for the adjacent states of the diagram, a facetted surface may be seen to appear. It may easily be observed that in a real mode of operation, a real observed state may not coincide with a state indicated in the diagram. In that case, the automatic control means carries out an interpolation, for example, a linear interpolation between two adjacent states to determine the command to be produced to correct this real observed state and change it to the ideal state. A linear interpolation is a simple technique and is frequently used for solving this type of problem. This interpolation may be used with conventional techniques.

If one has chosen not to use a look-up table (size too large), but rather, a fuzzy logic device, or a neural network, it is possible to combine this with the linear interpolation or non-linear interpolation computations at the moment said device or said network is defined. With a non-linear interpolation, the facets of the previous diagram may become curved facets representing the evolution of the commands necessary for correcting any real state of the system.

The learning of a fuzzy logic device may be realized in the following manner.

Figure 7:
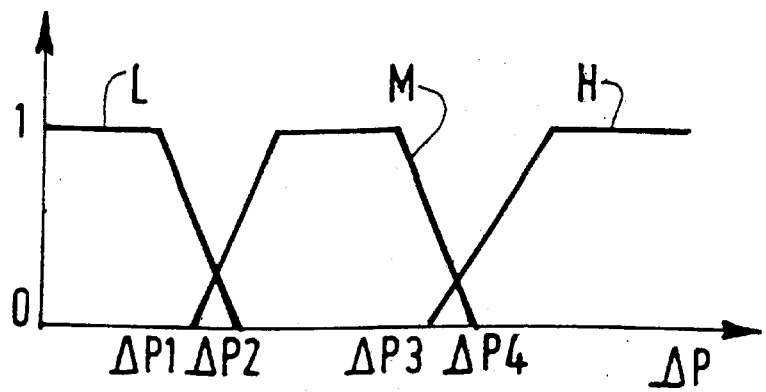
FIG. 7 gives a representation of fuzzy sets applied to each parameter of a state vector.

FIG. 7 forms an example of fuzzy sets which relate to one variable, for example, to a position error $\Delta P$, which measures the difference between the position P of the head and the center of the track. The following fuzzy sets are defined:

set L where the position error $\Delta P$ is small when $\Delta P < \Delta P_2$;

set M where the position error $\Delta P$ is average when $\Delta P_1 < \Delta P < \Delta P_4$;

set H where position error $\Delta P$ is large when $\Delta P > \Delta P_3$.

All the variables are then translated in the same manner in fuzzy sets which are stored in the automatic control means. A current value of variables could thus belong to one or various fuzzy sets. Inference rules are thereafter applied to effect the desired processing and derive therefrom a result to be obtained, for example, the computation of the constraint algorithm, or the simulation of the look-up table, or the interpolation between the sequence of commands.

This learning procedure can be conducted by applying the known "Anfis" algorithm of the MATLAB software described in the document "Optimisation Toolbox User's Guide", pp. 3-8 to 3-10 produced by "The Math Works, Inc., Natick, Mass.". The software automatically provides the inference rules used for generating the sequences of commands.

In the case where learning for producing sequences of commands is realized with the aid of a neural network, it is possible to provide, for example, a supervised learning. This consists of computing synaptic coefficients so that the results produced by the neural network are closest to the results expected in advance. This learning procedure could be conducted by applying the known "TrainBP" algorithm of the MATLAB software described in the document "Optimisation Toolbox User's Guide", pp. 9-99 to 9-101, produced by "The MathWorks, Inc., Natick, Mass.".

What is claimed is:

1. A method of controlling automatic state returns for a dynamic system coupled to automatic control means operating in a discrete feedback mode, the method comprising a defining phase for defining the automatic control means, and an operation phase for operating the system, wherein the defining phase is an open-loop learning phase comprising the steps:

reading states in which the system may be situated; and generating commands for correcting errors measured between the states and an ideal state, characterized in that the commands generating step comprising producing, for each state, a sequence of discrete commands which, when applied in succession, bring the dynamic system close to the ideal state, said sequence of discrete commands being determined by imposing a constraint for reducing the error relating to that state below a predetermined threshold after a predetermined duration of time.

2. The method as claimed in claim 1, characterized in that the sequence of commands enables control of a dynamic non-linear system.

3. The method as claimed in claim 2, characterized in that the sequence of discrete commands provides a non-linear control of the dynamic system.

4. The method as claimed in claim 1, characterized in that the sequence of commands enables non-linear control of the dynamic system.

5. An apparatus comprising a dynamic system operable in various states, and automatic control means coupled to the dynamic system, said automatic control means operating in a discrete feedback mode to achieve automatic state returns by correcting errors measured between the states and an ideal state, characterized in that the automatic control means comprises means for reducing the error relating to each state, said reducing means generating a sequence of discrete commands which, when applied in succession, bring the dynamic system close to the ideal state, said sequence of discrete command being determined by imposing a constraint intended to reduce the error relating to the state below a predetermined threshold after a predetermined duration of time.

6. The apparatus as claimed in claim 5, characterized in that the sequence of discrete commands realizes an automatic non-linear control of the dynamic system.

7. The apparatus as claimed in claim 6, characterized in that the dynamic system is non-linear.

8. The apparatus as claimed in claim 7, characterized in that the dynamic system is a hard disk.

9. The apparatus as claimed in claim 6, characterized in that the dynamic system is a hard disk.

10. The apparatus as claimed in claim 5, characterized in that the dynamic system is non-linear.

11. The apparatus as claimed in claim 10, characterized in that the dynamic system is a hard disk.

12. The apparatus as claimed in claim 5, characterized in that the dynamic system is a hard disk.

13. A controller for a dynamic system capable of adopting various states, said controller operating in a discrete mode realizing automatic state returns by correcting negative feedback errors measured between the states and an ideal state, characterized in that said controller comprises means for reduces the error relating to each state, said reducing means generating a sequence of discrete commands which, when applied in succession, bring the dynamic system close to the ideal state, said sequence of discrete command being determined by imposing a constraint intended to reduce the error relating to the state below a predetermined threshold after a predetermined duration of time.

14. The controller as claimed in claim 13, characterized in that said controller provides non-linear control of the dynamic system.

15. The controller as claimed in claim 14, characterized in that the dynamic system is a non-linear system.

16. The controller as claimed in claim 15, characterized in that the dynamic system is a hard disk.

17. The controller as claimed in claim 14, characterized in that the dynamic system is a hard disk.

18. The controller as claimed in claim 13, characterized in that the dynamic system is a non-linear system.

19. The controller as claimed in claim 18, characterized in that the dynamic system is a hard disk.

20. The controller as claimed in claim 13, characterized in that the dynamic system is a hard disk.

* * * * *

Disclaimer 6,029,095—Jean-Christophe Boissy, Saint Maurice (FR); Olivier Rech, Caen, (FR). METHOD AND DEVICE FOR DYNAMIC SYSTEM CONTROL. Patent dated February 22, 2000. Disclaimer filed March 28, 2008, by the assignee, U.S. Philips Corporation.

Hereby enters this disclaimer to all claims of said patent.

(*Official Gazette October 7, 2008*)